Sept. 18, 1956     R. C. BECK     2,763,180
APPARATUS FOR PHOTOGRAPHIC PRINTING
Filed July 22, 1953
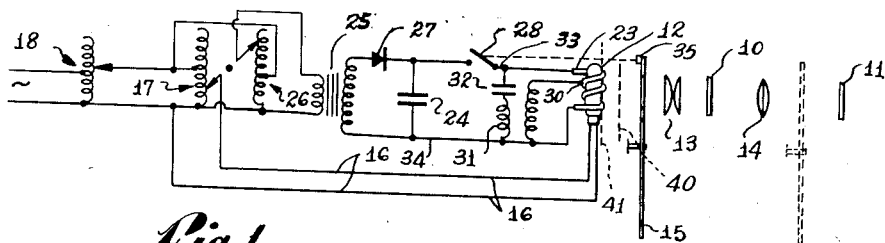
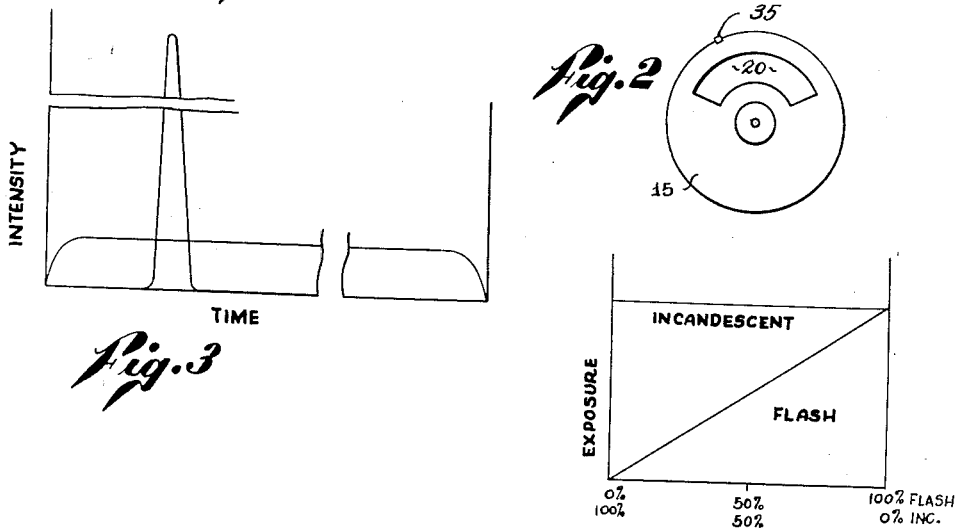
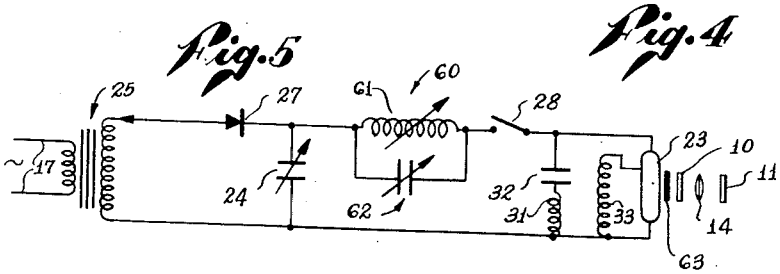
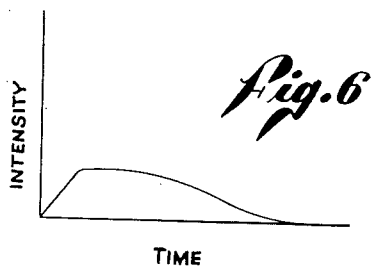
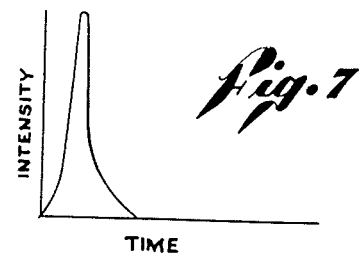
INVENTOR.
ROBERT C. BECK
BY Fulwider Mattingly & Babcock
Attorneys United States Patent Office 2,763,180
Patented Sept. 18, 1956

2,763,180

APPARATUS FOR PHOTOGRAPHIC PRINTING

Robert C. Beck, Los Angeles, Calif.

Application July 22, 1953, Serial No. 369,595

1 Claim. (Cl. 88—24)

My invention relates generally to photographic printing, and more particularly to an apparatus whereby the contrast of the finished print may be controlled in a unique manner.

In making prints from photographic negatives or positives, it is quite important to be able to control the contrast or gamma of the finished print. Photosensitive materials have been developed that have different contrast ranges, or gammas, and the contrast can also be controlled to a certain extent by the chemistry of development and processing. However, the photosensitive emulsion must often be selected for other of its characteristics, and the particular contrast desired may not be obtainable in the emulsion selected. Furthermore, the range through which the contrast or gamma may be controlled by chemical means is limited, and requires special processing that may be difficult to provide. Heretofore, the only recognized methods of changing the contrast of a photographic print have been by the selection of a suitable emulsion, and by the chemical means, and no other method has been known, so far as I am aware.

However, I have found that for a given emulsion and a given chemical treatment thereof, it is possible to control the contrast of the resultant image by controlling the exposure of the emulsion. In my previously filed copending application, Serial No. 132,620, filed December 12, 1949, now abandoned, and entitled "Lighting Means and Method for Photographic Processes," of which the present case is a continuation-in-part, I have disclosed a novel means and method for controlling the contrast by varying the exposure. Thus, by exposing a photosensitive emulsion to a flash of light of extremely short duration and of very high intensity, an image may be formed that is of relatively low contrast or gamma. Similarly, by increasing the duration of the flash, while reducing its intensity, so that the product of the intensity and the time in each case is the same, an image of greater contrast may be formed. This effect, which relies upon the failure of the reciprocity law, sometimes known as the Schwarzschild effect, can be used to control the contrast of photographic images in a manner and to a degree heretofore not believed obtainable. I have now found that by modifying the process slightly, an even greater range of contrast can be obtained with an emulsion subject to a standard treatment.

It is therefore a major object of my invention to provide a new and improved method of photographic printing by which the contrast or gamma of the finished print may be controlled over wider limits than heretofore believed possible.

Another object of my invention is to provide means for practicing the aforesaid method, these means being comparatively simple and not expensive.

It is a further object of my invention to provide a method and apparatus that may be used in the printing of color film, such as some of the well known commercially available films, such as "Kodacolor," "Anscocolor," etc.

Still another object of my invention is to provide a printing method and apparatus for practicing the same that is essentially a high-speed method, so that the actual printing operation may be accomplished very quickly.

It is a still further object of my invention to provide such a method and apparatus that is effective with all silver-salt type photographic emulsions I am presently aware of.

These and other objects and advantages of my invention will become apparent from the following description of the method, various forms of the apparatus for practicing the method, and from the drawings thereof, in which:

Figure 1 is a schematic wiring diagram, with portions of the optical equipment indicated thereon, of one form of apparatus for practicing my invention;

Figure 2 is an elevational view of a shutter that may be used in conjunction with the remainder of the apparatus shown in Figure 1;

Figure 3 is a graph illustrating in a general manner the relative distribution of light energy in the hight intensity flash and the lower intensity exposure;

Figure 4 is a graph illustrating the reciprocal variation between the values of the two light sources;

Figure 5 is a schematic wiring diagram of another form of device, used to control the duration and intensity of the flash of light;

Figure 6 is a graph illustrating one type of discharge that may occur within the flash tube of Figure 5; and Figure 7 is a graph illustrating another type of discharge that may occur within that flash tube.

Considering first the theory of operation of my method, it is usually thought that the effective exposure of a photosensitive emulsion is dependent simply on the total energy employed, that is, on the product of intensity and time, and is independent of the two factors separately. From the reciprocal relation between time and intensity, this is called the reciprocity law. However, at very low intensities, and at very short times, this reciprocity law does not hold. As a result, an extremely intense light of extremely short duration will produce less effect upon the photographic emulsion than a less intense flash lasting for a longer period of time, even though the product of the time and intensity is the same in each case. I have found that by controlling the total energy in the light or exposure, and controlling the time during which the exposure occurs, I am able to control both the density and the contrast of a photosensitive emulsion. This form of my invention has been the subject of my previously mentioned copending application.

In another form of my invention, I likewise make use of a very bright and intense flash of light lasting for a very short period of time, and use in conjunction with this flash a light of much lower intensity, occurring for a much longer period of time. This second form of my invention may be considered as an extension of the first form, but appears not to rely upon the Schwarzschild effect, since the length of time of the weaker exposure is many times longer than the flash. The reasons for the results are not clear at present, but the results themselves are quite evident.

Turning now to the drawings nad particularly to Figure 1 thereof, I have illustrated a simplified schematic representation of a device capable of practicing the latter form of my invention. In that figure, the numeral 10 indicates generally a photographic image, hereinafter referred to as a negative (though it is clear that the image may equally well be a positive), that is to be printed upon another photosensitive member 11, hereinafter referred to as photographic film. Relatively low intensity light, such as from an incandescent globe 12, is passed through a condensing lens system 13, through the negative 10, and focused by a lens system 14 to fall upon the film 11. A shutter, such as a mechanically rotating shutter 15, controls the passage of light through the negative 10 to the film 11. The incandescent globe is connected by wires 16 to a voltage controller such as variable transformer 17 that in turn is connected to another power controller such as a variable transformer 18 supplied with electrical energy from a source of power (not shown). While other types of shutters may be used, I have found that a rotary shutter, such as illustrated in Figure 2 is convenient. Such a shutter may be formed with a generally sector shaped opening 20 of desired arc. In this manner, when the shutter 15 is rotated by any convenient means, such as a motor (not shown), light will fall upon the film 11 during that portion of the time that the opening 20 is aligned with the light source 12.

The light source 12, whose intensity is controlled by the variable transformers 17 and 18, provides the relatively low intensity illumination or exposure that I use in this form of my method. To provide the relatively high intensity light, which must be of exceedingly short duration, I make use of a gaseous conduction tube 23 that is adapted to provide light that is transmitted through the negative 10 to the film 11 at some time during the period when the shutter 15 is open. The function of such a tube is to provide a very intense flash of light, lasting a very short time, and this is accomplished by discharging a capacitor 24 through the tube 23. To charge the capacitor, I preferably use a transformer 25 whose primary winding is connected to a variable transformer 26 that in turn is connected to the variable transformer 18. The secondary of the transformer 25 is connected through a rectifier 27 to the terminals of the capacitor 24, and the charge impressed thereon may be controlled by either or both of the variable transformers 26 and 18. To discharge the capacitor 24, a switch 28 is provided to complete a circuit from the capacitor to the discharge tube 23, so that power stored in the capacitor may be discharged through the tube. Normally gaseous conduction tubes of this type require some means to trigger or initiate the discharge, and a trigger electrode 30 is provided for this purpose. When this electrode is energized, a discharge within the tube 23 is initiated, and thereafter the power from the capacitor 24 is discharged to produce the short but brilliant flash of light. Various methods may be used to energize the electrode 30, and by way of example only, and not as a limitation, I have shown the system disclosed in my prior patent, No. 2,513,396 issued July 4, 1950, and entitled, "Ionization System for Gaseous Conduction Lamps." In this system, a transformer 31 has its primary winding connected through a capacitor 32 to the leads 33 and 34 leading to the end terminals of the tube 23. The secondary of the transformer is connected to one of the leads and to the trigger electrode 30 so that when the capacitor 24 is connected to the leads 33 and 34, a high voltage pulse is applied to the trigger electrode 30, thereby causing the ionization of a gas within the tube 23 and the discharge of the capacitor 24 therethrough.

Thus, upon closure of the switch 28, the capacitor 24 is discharged through the tube 23 to produce a brilliant flash of light of short duration. The incandescent globe 12 is continuously lit, and consequently the globe produces a continuous lower level of illumination, while the tube 23 produces periodic flashes of intense illumination. To synchronize the closure of the switch 28, and hence the flashing of the tube 23 with the operation of the shutter 15, a cam or trip member 35 may be positioned upon the rim of the shutter 15 so that the switch 28 is momentarily operated while the shutter is opened.

By reference to Figure 1, it will be seen that variable transformer 26 can be adjusted to control the voltage applied to capacitor 24, and thus control the charge thereon. The charge appearing on capacitor 24 in turn controls the amount of light emitted by the tube 23, and thus variable transformer 26 controls the light from the tube. Likewise, variable transformer 17 controls the voltage applied to the incandescent globe 12, and hence the light emitted by that globe. As further indicated in Figure 1, I have so interconnected the controls for the variable transformers 17 and 26 that as the output voltage of one is raised, the output voltage of the other is lowered. The relationship between these two controls need not be a linear one, and generally is not, since the output of light from the globe 12 and the tube 23 is usually very sensitive to voltage. However, the relationship between the controls for the variable transformers is selected so that the total light energy from the incandescent globe 12 and the tube 23 is a constant, regardless of the setting of the combined control. This is illustrated graphically in Figure 4, where it is seen that the total emitted light output remains a constant while the proportions of light from the globe 12 and the tube 23 vary inversely with each other.

To control the total amount of light energy from the tube 23 and the globe 12, and consequently to control the overall density of the finished print, I provide the variable transformer 18 that controls the voltage delivered to the primaries of the variable transformers 17 and 26. Thus, by increasing the voltage delivered by variable transformer 18, the voltages delivered by the transformers 17 and 26 are increased proportionately, and the total output of light from the globe 12 and the tube 23 is increased while the sources contribute the same proportionate amounts. In this manner, density and contrast may be controlled separately and independently, thereby providing the maximum versatility for the system.

By way of example, I have illustrated in Figure 3 how the light outputs of the globe 12 and of the tube 23 may compare. It will be appreciated that the duration of the flash produced by the tube 23 will be extremely short, and the time is usually measured in microseconds, something between 50 and 1000 microseconds being the usual range. On the other hand, the exposure by the incandescent globe 12 will be much longer, and may last for 20 seconds. Consequently, it has been necessary to indicate a discontinuity in the time scale of that graph. Similarly, the intensity of the flash from the tube 23 is so much greater than the constant light from the globe 12 that it has been necessary to indicate a break in the intensity scale. Making these adjustments, the graph shown in Figure 3 may be considered as indicating a condition when approximately equal quantities of light-energy are provided by the globe 12 and the tube 23.

In those cases where the color of the light emitted by the globe 12 is of importance, as in making prints from color films, the variable transformer 18 may be replaced by a variable diaphragm 40 or other suitable means operable to control the total light-energy from the globe 12 and tube 23. Similarly, by separating the globe and the tube, a similar control means 41 may be used to vary the light-energy from the globe 12 alone. When this is done, the globe control means 41 will normally be operated simultaneously and inversely with respect to the control for the variable transformer 26 by suitable interconnecting means.

In one embodiment of this form of my device, I have used variable auto-transformers of a type commercially available under the trade name "Variac." Other types are available, and any suitable type may be used as the variable transformers 17, 18 and 26. The transformer 25 is one having a relatively low voltage primary and a high voltage secondary, and by adjusting the variable transformers 18 and 26, the useful voltage of the secondary of the transformer 25 may be varied from zero volts to four thousand volts. The rectifier 26 may be of a suitable type adapted to withstand such voltages, and selenium rectifiers are quite satisfactory for this purpose. The capacitor 24 has a capacitance of from 1 to 30 mfd., and usually is within the range of from 1 to 10 mfd.

Finally, the discharge tube 23 may be any one of a number of such devices on the market, and I have found that, among others, the tube designated as FT 220 works very satisfactory. While I have indicated the shutter 15 as being positioned between the light sources 12 and 23, and the condenser lens 13, this is not essential, and the shutter may equally well be positioned between the lens 14 and the film 11, as indicated by dotted outline in Figure 1.

In the operation of this form of my device, the density control member 18 (or the diaphragm 40) is adjusted to give the approximate exposure desired, and the ratio control members, including the variable transformer 26 and the variable transformer 17 (or alternatively the diaphragm 41) are then adjusted to secure the desired contrast of the finished print. The maximum contrast is obtained with 100 per cent of the light being provided by the incandescent globe 12, and the minimum contrast is obtained with all of the light provided by the tube 23. It is to be appreciated that with either maximum or minimum contrast, the tonal range of the finished print is from black to white, or the equivalent thereof. However, in a maximum contrast print there are fewer intermediate gray values, and a step type gray scale shows comparatively few steps between black and white. On the other hand, a low contrast print shows a larger number of steps in the gray scale between black and white.

In Figure 5, I have illustrated other apparatus intended to make use of the properties of very short and intense flashes of light to control the contrast of photographic prints. In this figure, a transformer 25 has its primary connected to a source of electrical power (not shown). The secondary of the transformer is connected through a rectifier 27 to a capacitor 24, which preferably is variable. The energy within the capacitor 24 is discharged through a control circuit 60 and a switch 28 to the gaseous conduction tube 23. An ionization circuit such as that previously described, and comprising a capacitor 32, a primary winding 31, and a secondary winding 33, provides the voltage for triggering the discharge tube 23, all as previously described.

The control circuit 60 is inserted in series with a capacitor 24 and tube 23, and includes an inductor 61 and a capacitor 62, both preferably variable. The inductor 61 and capacitor 62 are connected in parallel, and have the effect of modifying the time during which the discharge from the capacitor 24 occurs through the tube 23. The transformer 25 preferably provides a variable voltage to the capacitor 24 and thus the total quantity of energy stored in the capacitor may be controlled. The control circuit 60 controls the time during which this energy is discharged through the tube 23, and thus the quantity and duration of the discharge can be separately and independently controlled.

Assuming that the transformer 25 has been adjusted so that a print of satisfactory density but unsatisfactory contrast is obtained, the control circuit 60 is then adjusted to vary the contrast. If a greater contrast is desired, the capacitor 62 is adjusted to decrease its capacitance, while the inductor 61 is adjusted to increase its inductance. In this manner, the charge or energy within the capacitor 24 is discharged over a longer period of time, and the flash of light from the tube 23 is made less brilliant, but of longer duration.

If less contrast is desired, the inductance of inductor 61 is decreased. When this is done, the discharge time will be shorter, and the intensity of the light will be greater. In each case, of course, the light from the tube 23 is passed through the photographic image or negative 10, is focused by a lens system 14, to fall upon a photosensitive material or film 11 and form a latent image therein that is later developed and processed in the customary manner. If a change in overall density is desired, this is accomplished by changing the total light output from the tube 23, such as by varying the voltage supplied by the transformer 25, varying the capacitance of the main capacitor 24, or by inserting a neutral filter 63 or diaphragm 40 between the light 23 and the film 11.

If it is desired to print color film, the tube 23 may be selected to produce a substantially white light, in which case only a single exposure of the photographic image 10 is necessary, or a color filter may be used, such as a color filter 63 so that only a single one of the plurality of emulsions is effected by each exposure. By changing the color filter 63, the remaining emulsions may be separately exposed, and outstandingly successful results have been obtained by this type of operation.

In Figures 6 and 7, I have illustrated the types of discharge that may be obtained from the discharge tube 23 by varying the control circuit 60. Thus in Figure 6, I have shown a discharge of relatively low intensity and long duration, secured by increasing the inductance of the inductor 61 and decreasing the capacitance of the capacitor 62. While the total duration of such a flash is still very short, probably not exceeding $\frac{1}{800}$ of a second in any event, it corresponds to, and produces results similar to, the exposure produced solely by the incandescent globe 12 of the previously described form. Consequently, a print made by such an exposure will have a maximum of contrast.

On the other hand, if the capacitance of the capacitor is increased to its maximum value and the inductor 61 is removed from the circuit, a flash of minimum duration will be obtained, such as indicated in Figure 7, and a print of less contrast will be secured. This corresponds to the condition in which only the tube 23 provides the exposure light in the previously described form. With intermediate values of the inductor 61 and capacitor 62, flashes of intermediate intensity and duration will be obtained, and prints of intermediate contrast will be secured.

One set of components that have been found to produce very satisfactory results, includes a capacitor 24 of from 1 to 30 mfd. capacitance, an inductor 61 of from 0 to 5 h. inductance, and a capacitor 62 of from 1 to 10 mfd. capacitance. With such components, a voltage, preferably variable, of from one thousand to four thousand volts should be supplied by the transformer 25, and the tube 23 may be the type FT 220 previously mentioned.

From the foregoing, it will be seen that I have disclosed a method of controlling the contrast of photographic prints, and have described apparatus capable of practicing this method, fully capable of achieving the objects and securing the advantages heretofore set forth. While I have shown and described various forms of my method and device, it will be apparent to those skilled in the art that changes may be made therein without departing from the broad scope of my invention as disclosed herein. Consequently, while I have shown and described various forms of my invention, I do not wish to be restricted to the particular form or arrangements of parts or sequence of steps herein described and shown, except as limited by my claim.

I claim:

Photographic printing apparatus for controlling the contrast of the finished print, which includes: a gaseous conduction discharge tube; a capacitor adapted to be connected to said tube to discharge therethrough and thereby produce a flash of light; means adapted to charge said capacitor, adjustable to control the amount of energy stored in said capacitor, said means including a first variable transformer means; an incandescent lamp; means for illuminating said lamp and controlling the light output therefrom, said means including a second variable transformer means; means for passing the light from said tube and from said lamp, from an image to be copied, to a photosensitive emulsion; means interconnecting said first and second variable transformer means so that as the output of one of said transformer means is increased, the output of the other is decreased; and means for simultaneously controlling the output of said first and second transformer means, and including a third variable transformer means connected to the inputs to said first and second transformer means.

References Cited in the file of this patent

UNITED STATES PATENTS 2,530,396  McGuffin _____ Nov. 21, 1950

OTHER REFERENCES

Book, "Photographic Theory and Practice," 2nd Edition, 1937, Clerc. Page 360.

Book, "Theory of the Photographic Process," Mees, 1942, pages 244–249.

Publication, "Photographic Engineering," vol. 2, No. 1, 1951, pages 10–19.